(12) United States Patent
Asano (10) Patent No.: US 7,793,047 B2
(45) Date of Patent: Sep. 7, 2010

(54) APPARATUS AND METHOD FOR GENERATING A SECONDARY CACHE INDEX

(75) Inventor: Shigehiro Asano, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 576 days.

(21) Appl. No.: 11/878,019

(22) Filed: Jul. 20, 2007

(65) Prior Publication Data

US 2008/0120467 A1 May 22, 2008

(30) Foreign Application Priority Data

Nov. 17, 2006 (JP) ............... P2006-311842

(51) Int. Cl.
*G06F 12/08* (2006.01)
*G06F 12/12* (2006.01)
(52) U.S. Cl. ........................... 711/122; 3/124
(58) Field of Classification Search .......... 711/3, 711/122, 124
See application file for complete search history.

(56) References Cited

U.S. PATENT DOCUMENTS 7,290,116 B1 * 10/2007 Grohoski et al. ............ 711/216

2005/0125592 A1 * 6/2005 Sawdey ........................ 711/3
2007/0168617 A1 * 7/2007 Borkenhagen et al. ...... 711/133

OTHER PUBLICATIONS

R. Kessler et al., "Inexpensive Implementations of Set-Associativity," 16$^{th}$ ISCA, pp. 131-139 (May 1989).

* cited by examiner

*Primary Examiner*—Shane M Thomas
(74) *Attorney, Agent, or Firm*—Finnegan, Henderson, Farabow, Garrett & Dunner, L.L.P.

(57) ABSTRACT

An information processing apparatus includes: a main memory that stores data; a plurality of processors each provided with a primary cache memory; a secondary cache memory that is provided between the main memory and the processors, the secondary cache memory having larger capacity than the primary cache memory; and a cache controller that performs cache search on the secondary cache memory based on a second index uniquely generated by joining: 1) a bit string having a predetermined bit length; and 2) a first index that is included in a data access command transmitted from any one of the processors, the first index being used for performing cache search on the primary cache memory.

14 Claims, 9 Drawing Sheets

APPARATUS AND METHOD FOR GENERATING A SECONDARY CACHE INDEX

RELATED APPLICATION(S)

The present disclosure relates to the subject matter contained in Japanese Patent Application No. 2006-311842 filed on Nov. 17, 2006, which is incorporated herein by reference in its entirety.

FIELD

The present invention relates to an information processing apparatus having a plurality of processors each provided with a primary cache memory, a main memory, and a secondary cache memory provided between the processors and the main memory. The present invention also relates to a secondary cache memory chip and a method for performing cache search.

BACKGROUND

It is widely used an information processing apparatus having a hierarchical cache memory configuration, in which a secondary cache memory is provided between a main memory and a plurality of processors each provided with a primary cache memory. Since a plurality of cache memories exist hierarchically in such an information processing apparatus, it is indispensable to ensure consistency of data.

In order to ensure consistency of data, it is an important factor to satisfy multi-level inclusion. The multi-level inclusion means that a secondary cache memory is placed in a state in which the secondary cache memory contains the same data as the data stored in the primary cache memories in the processors.

To satisfy the multi-level inclusion, there is proposed a technique of associating the memory block of the data stored in each primary cache memory and the memory block of the data stored in a secondary cache memory with each other. For example, refer to the following related-art document (hereinafter simply referred to as "Kessler").

R. Kessler, R. Jooss, A. Lebeck, M. Hill, "Inexpensive Implementation of Set-Associative," 16th ISCA, May 1989, pp. 131-139

In a system satisfying the multi-level inclusion, when data is read from a secondary cache memory, a plurality of areas in the secondary cache memory need to be searched to determine whether or not the corresponding data is stored at the read address. As exemplary algorithm for performing such search, Kessler proposes simple sequential search, MRU (Most Recently Used) and Partial Compare.

In the information processing apparatus having a plurality of processors each provided with a primary cache memory and a secondary cache memory, preferably improvement in the processing speed and downsizing of circuitry are satisfied at the same time. However, in the technique disclosed in Kessler, the memory block in the secondary cache memory is always searched starting at the top address of the memory block, and thus, it takes much time in determining whether or not the data to be read is stored in the secondary cache memory.

The algorithms of MRU and Partial Compare for speeding up data search in a plurality of memory blocks in the secondary cache memory leads to a complicated hardware mechanism.

SUMMARY

It is therefore an object of the invention to provide an information processing apparatus and a data search method for performing search at high speed in a small circuit scale while satisfying multi-level inclusion.

According to a first aspect of the invention, there is provided an information processing apparatus including: a main memory that stores data; a plurality of processors each provided with a primary cache memory; a secondary cache memory that is provided between the main memory and the processors, the secondary cache memory having larger capacity than the primary cache memory; and a cache controller that performs cache search on the secondary cache memory based on a second index uniquely generated by joining: 1) a bit string having a predetermined bit length; and 2) a first index that is included in a data access command transmitted from any one of the processors, the first index being used for performing cache search on the primary cache memory.

According to a second aspect of the invention, there is provided a secondary cache memory chip provided between a main memory that stores data and a plurality of processors each provided with a primary cache memory, the secondary cache memory chip including: a secondary cache memory that has larger capacity than the primary cache memory; and a cache controller that performs cache search on the secondary cache memory based on a second index uniquely generated by joining: 1) a bit string having a predetermined bit length; and 2) a first index that is included in a data access command transmitted from any one of the processors, the first index being used for performing cache search on the primary cache memory.

According to a third aspect of the invention, there is provided a method for performing cache search in an information processing apparatus having: a main memory that stores data; a plurality of processors each provided with a primary cache memory; and a secondary cache memory that is provided between the main memory and the processors, the secondary cache memory having larger capacity than the primary cache memory, wherein the method includes: generating a second index by joining: 1) a bit string having a predetermined bit length; and 2) a first index that is included in a data access command transmitted from any one of the processors, the first index being used for performing cache search on the primary cache memory; and performing cache search on the secondary cache memory based on the second index.

DETAILED DESCRIPTION OF THE EMBODIMENTS

Embodiments of the invention will be discussed in detail with reference to the accompanying drawings. In the following description, identical parts are denoted by the same reference numerals and will not be discussed again.

Figure 1:
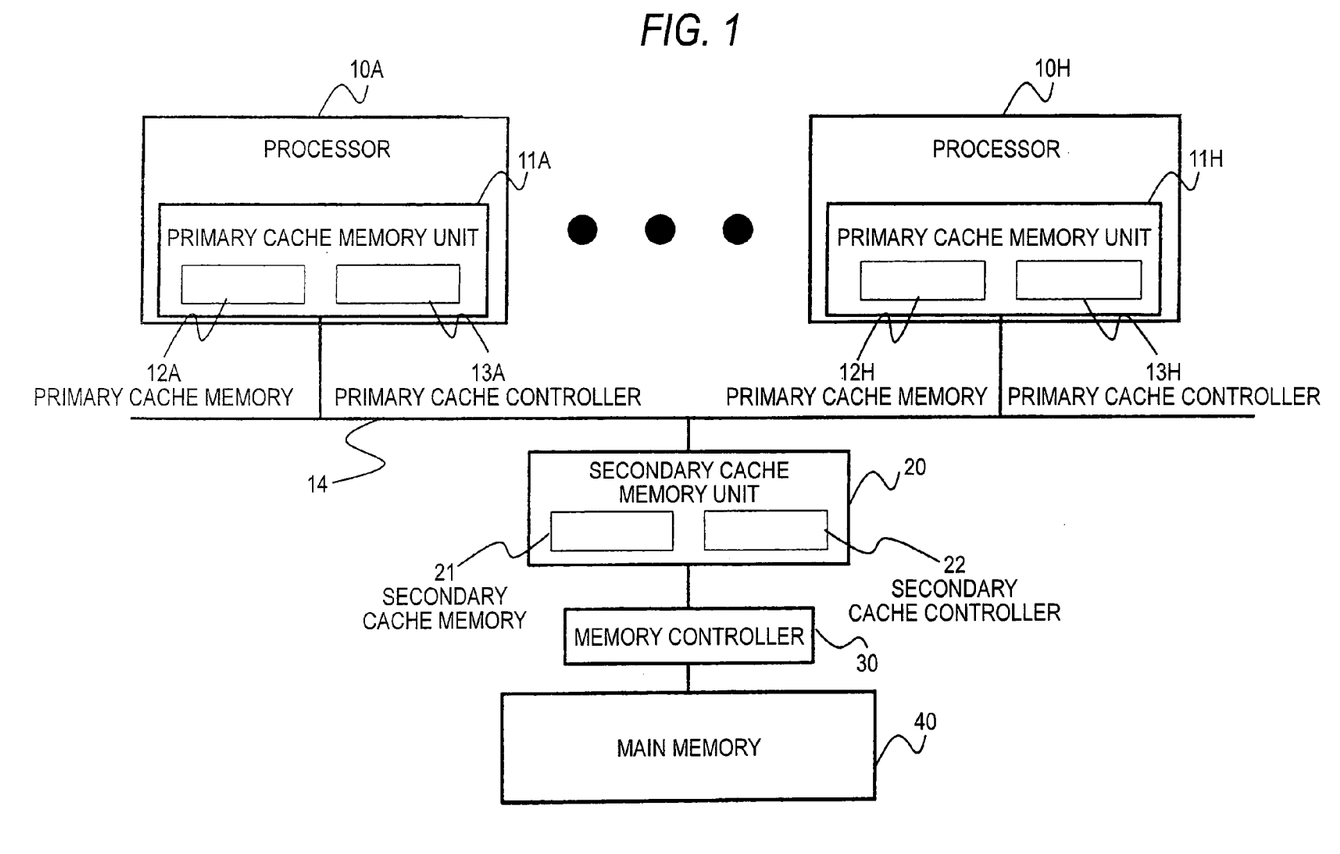
FIG. 1 is a drawing to show a general configuration of an information processing apparatus including a plurality of processors and a hierarchical cache memory system according to an embodiment of the present invention.

FIG. 1 is a drawing to show a general configuration of an information processing apparatus according to an embodiment of the present invention.

The information processing apparatus of the embodiment includes, for example, eight processors 10A to 10H, primary cache memory units 11A to 11H provided uniquely in a one-to-one correspondence with the processors 10A to 10H, a secondary cache memory unit 20 connected to the primary cache memory units 11A to 11H through a bus 14, a memory controller 30 connected to the secondary cache memory unit 20, and main memory 40 controlled by the memory controller 30.

The primary cache memory units 11A to 11H are provided with primary cache memories 12A to 12H that provide storage areas and primary cache controllers 13A to 13H that control data access to the storage areas. A partial copy of data stored in the main memory 40 is stored in the primary cache memories 12A to 12H under the control of the primary cache controllers 13A to 13H respectively.

The secondary cache memory unit 20 includes a secondary cache memory 21 that provides a storage area and a secondary cache controller 22 that controls memory access to the storage area. The same data as the data stored in the primary cache memory units 11A to 11H is stored in the secondary cache memory 21 under the control of the secondary cache controller 22. When the processors 10A to 10H performs memory access, the corresponding primary cache memory 12A to 12H, the secondary cache memory 21, and the main memory 40 are accessed.

Each of the processors 10A to 10H transmits command information to the secondary cache memory unit 20 to read data or a program from or write data into the main memory 40. The command information includes address information for accessing data, a processing request (Read, Write, etc.), information indicating data length (such as a size of a cache line, etc.).

The command information transmitted from the processors 10A to 10H is received not only by the main memory 40, but also by the corresponding primary cache memory units 11A to 11H and the secondary cache memory unit 20.

Next, an operation of the processor 10A for accessing the primary cache memory 12A, the secondary cache memory 21, or the main memory 40 to read out data will be discussed. The processors 10A to 10H access their proper primary cache memory units 11A to 11H in the same manner and therefore the operation of the processor 10A will be discussed as an example.

The primary cache controller 13A receives the command information transmitted from the processor 10A. If the data specified by the address contained in the command information is stored in the primary cache memory 12A, the primary cache memory unit 11A results in a cache hit. In this case, the primary cache controller 13A transmits the read data from the primary cache memory 12A to the processor 10A.

On the other hand, if the data specified by the address is not stored in the primary cache memory 12A, the primary cache memory unit 11A results in a cache miss and the operation is terminated.

The secondary cache controller 22 receives the command information sent to the primary cache memory unit 11A at the same time. If the data specified by the address contained in the received command information is stored in the secondary cache memory 21, the secondary cache memory unit 20 results in a cache hit. The secondary cache controller 22 supplies the read data from the secondary cache memory 21 to the processor 10A and the primary cache memory unit 11A. If the data specified by the address is not stored in the secondary cache memory 21, the secondary cache memory unit 20 results in a cache miss and the operation at the cache miss time is performed. In this case, data read from the main memory 40 through the memory controller 30 is supplied to the processor 10A, the primary cache memory unit 11A, and the secondary cache memory unit 20. If data is supplied from the primary cache memory unit 11A or the secondary cache memory unit 20 to the processor 10A, the data supplied by the main memory 40 is made invalid.

The primary cache memory 12A to 12H and the secondary cache memory 21 are implemented as N-way set associative memory in which N pieces of data are stored in the storage area specified by one index. In the n-way set associative memory, N pieces of line data are found in one search and thus the number of ways N is increased, whereby a conflict in the cache memory can be prevented. However, it is difficult on implementation to set the number of ways N exceeding a given value.

Next, the correspondence between the areas of the primary cache memory units 11A to 11H and the secondary cache memory unit 20 will be discussed.

Here, it is assumed that each of the primary cache memory units 11A to 11H has a storage capacity of 16 kilobytes, adopts a two-way set associative type memory, has a cache line size of 32 bytes, and includes 256 cache lines, for example.

It is assumed that the secondary cache memory unit 20 has a storage capacity of 256 kilobytes, adopts a four-way set associative type memory, has a cache line size of 32 bytes, and includes 2048 cache lines.

The primary cache controller 13A extracts a 19-bit L1 tag, an eight-bit L1 index, and a five-bit offset from a 32-bit address transmitted from the processor 10A. The L1 tag is used to identify line data in a cache line. The L1 index is used to specify the cache line to store line data. The offset is used to determine the which data piece in the line data the data piece is.

The primary cache controller 13A uses the L1 index to determine the address of the primary cache memory 12A. Next, the primary cache controller 13A makes a comparison between the tags of a plurality of pieces of line data read from the determined address and the L1 tag. If a match is found in the comparison, a cache hit occurs; if all are mismatch, a cache miss occurs. Further, when a cache hit occurs, the data in the line data is specified according to the offset and is supplied to the processor 10A.

On the other hand, the secondary cache controller 22 extracts a 19-bit L2 tag (the same as the L1 tag), a five-bit offset (the same as the L1 index), and an eight-bit index (the same as the L1 index) from the 32-bit address transmitted from the processor 10A. Further, the secondary cache controller 22 joins a three-bit candidate number, for example, to the high-order part of the eight-bit index to create an 11-bit L2 index. This means that the correspondence is set between one L1 index and eight L2 indexes.

Figure 2:
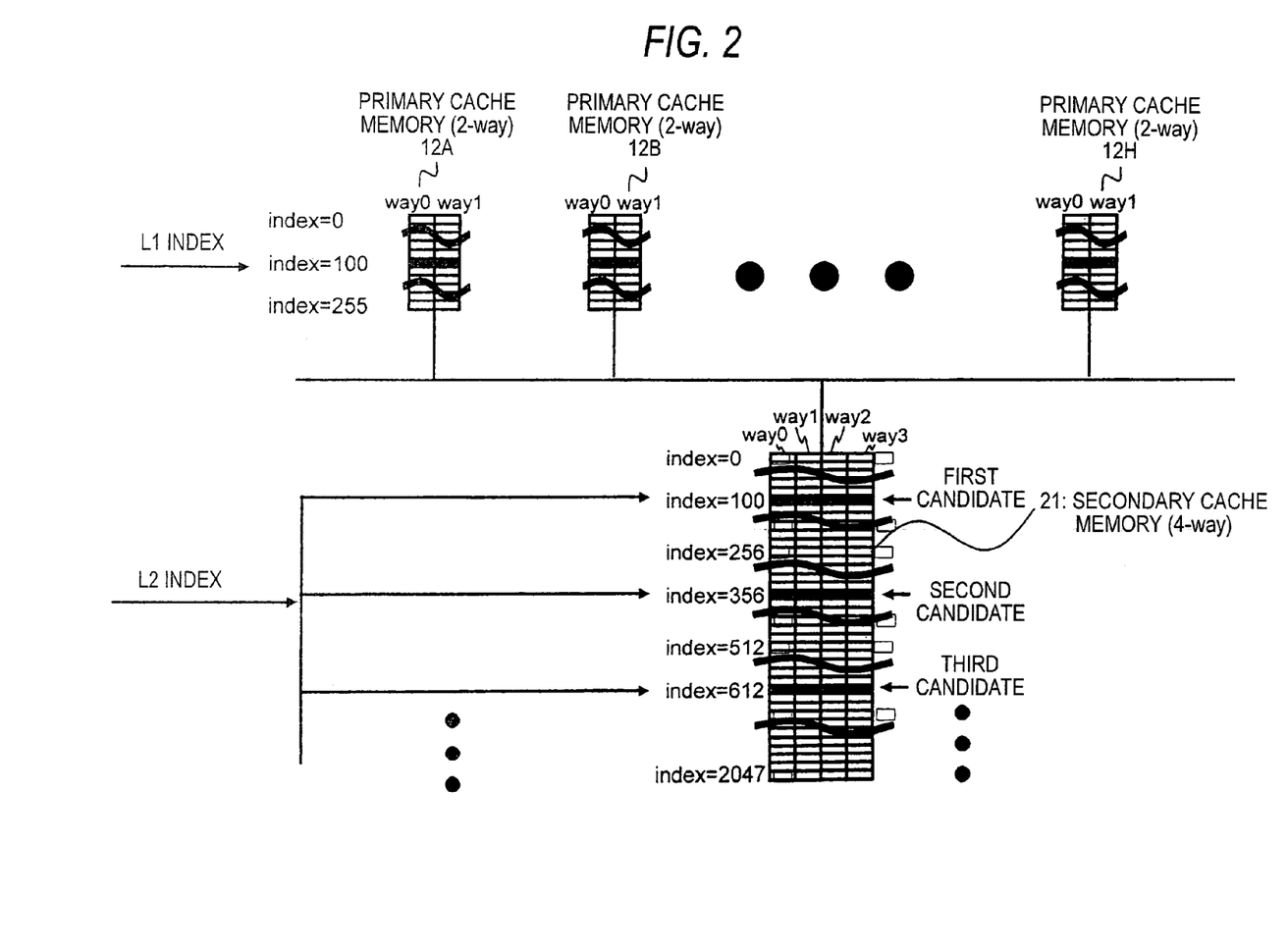
FIG. 2 is a drawing to show the correspondence between an L1 index and a plurality of L2 indexes.

FIG. 2 shows a specific example of the correspondence between the primary cache memory units 11A to 11H and the secondary cache memory unit 20.

It is assumed that the eight-bit L1 index extracted by the primary cache controller 13A of the primary cache memory unit 11A from the address transmitted from the processor 10A is address 100, for example. At this time, the secondary cache controller 22 of the secondary cache memory unit 20 also extracts the index of address 100 which is the same as the L1 index from the address transmitted from the processor 10A like the primary cache controller 13A.

In contrast, the secondary cache memory 21 has the index capacity (2048) eight times the index capacity (256) of the primary cache memory 12A. Thus, the secondary cache controller 22 joins a three-bit candidate number to the extracted L1 index to create eight L2 indexes. For example, to join a three-bit candidate number to the MSB (Most Significant Bit) of the eight-bit L1 index, eight L2 indexes of address 100, address 356 (100+256), address 612 (100+512), . . . , and address 1892 (100+1792) are created from the L1 index of address 100. This means that the data at the address with the L1 index being address 100 is stored in any of the eight candidates of address 100, address 356, address 612, . . . , and address 1892. 32-byte line data is read from each address.

That is, to satisfy the multi-level inclusion, 16 pieces of line data stored in the storage areas of the primary cache memory 12A to 12H specified by the L1 index may be stored in the 32 cache lines of the secondary cache memory 21 specified by the eight L2 indexes.

Figure 3:
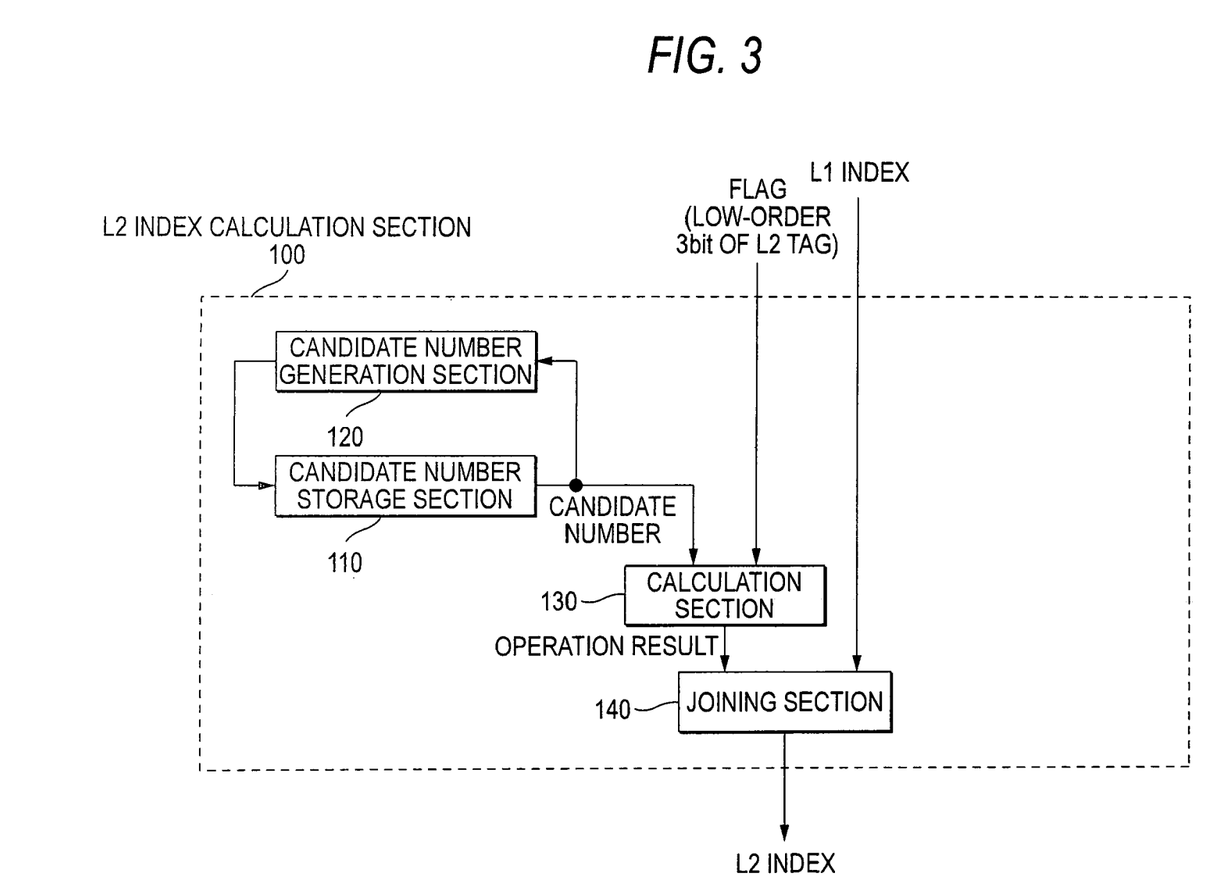
FIG. 3 is a block diagram to show the configuration of an L2 index calculation section.

Next, the configuration of an L2 index calculation section 100 for creating L2 indexes in the secondary cache controller 22 will be discussed. FIG. 3 is a block diagram to show an internal configuration of the L2 index calculation section.

An eight-bit L1 index and a flag of a bit string of a part of an L2 tag are input to the L2 index calculation section 100. Here, for example, the flag is the low-order three bits of the L2 tag. The L1 index is used to calculate eight L2 indexes. The flag is used to determine the search order of the areas specified in the eight L2 indexes.

The L2 index calculation section 100 has a candidate number storage section 110 for storing a candidate number, a candidate number generation section 120 for generating the candidate number, a calculation section 130 for performing logical operation on the flag and the candidate number, and a joining section 140 for joining the L1 index and the calculation result of the calculation section 130 to create L2 indexes.

Figure 4:
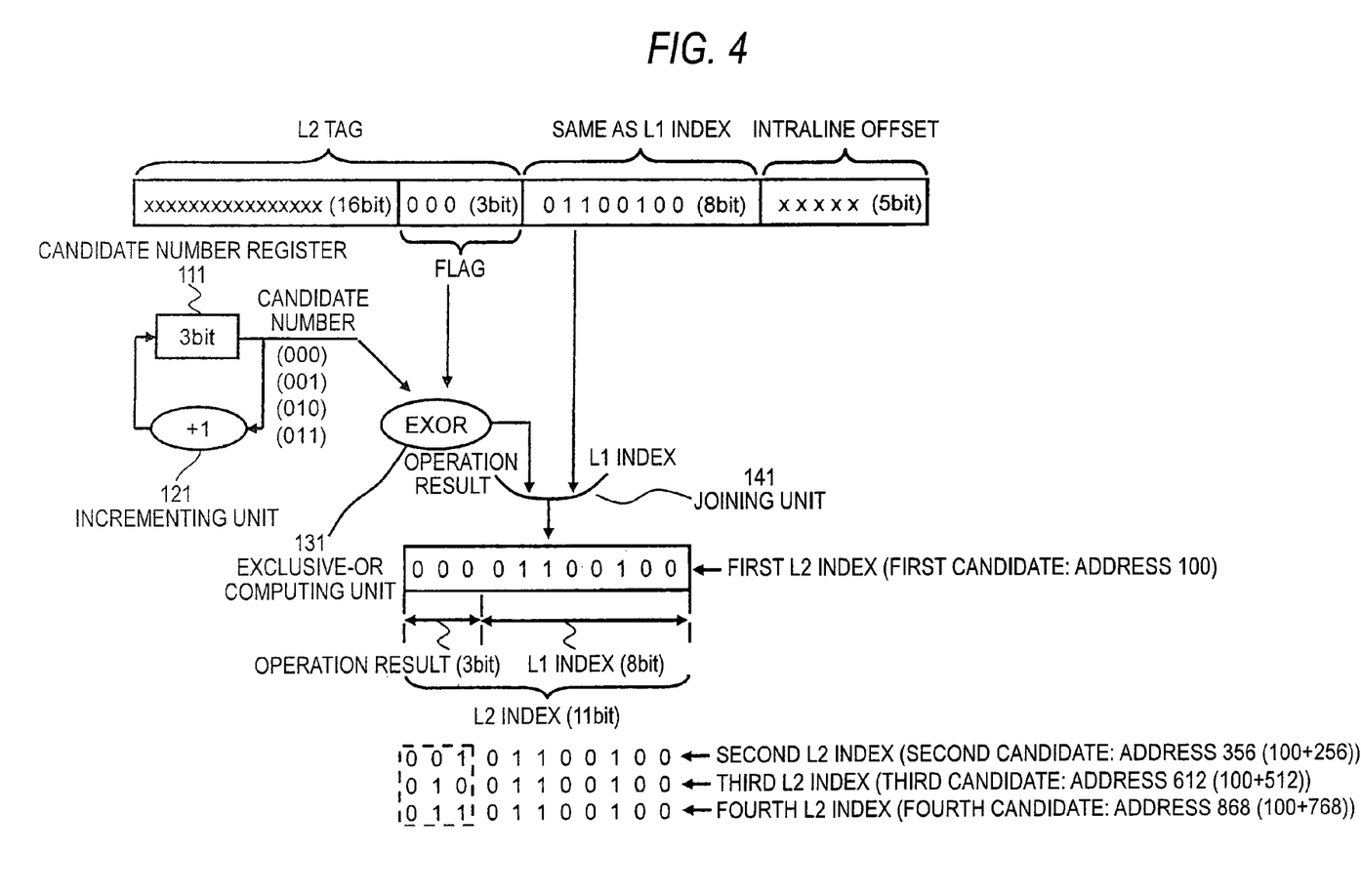
FIG. 4 is a drawing to show a specific example of the configuration of the L2 index calculation section.

FIG. 4 shows a specific example of the internal configuration of the L2 index calculation section 100. The L2 index calculation section 100 has a candidate number register 111 that serves as the candidate number storage section 110, an incrementing unit (update unit) 121 that serves as the candidate number generation section 120, an exclusive-OR computing unit 131 that serves as the calculation section 130, and a joining unit 141 that serves as the joining section 140.

Figure 5:
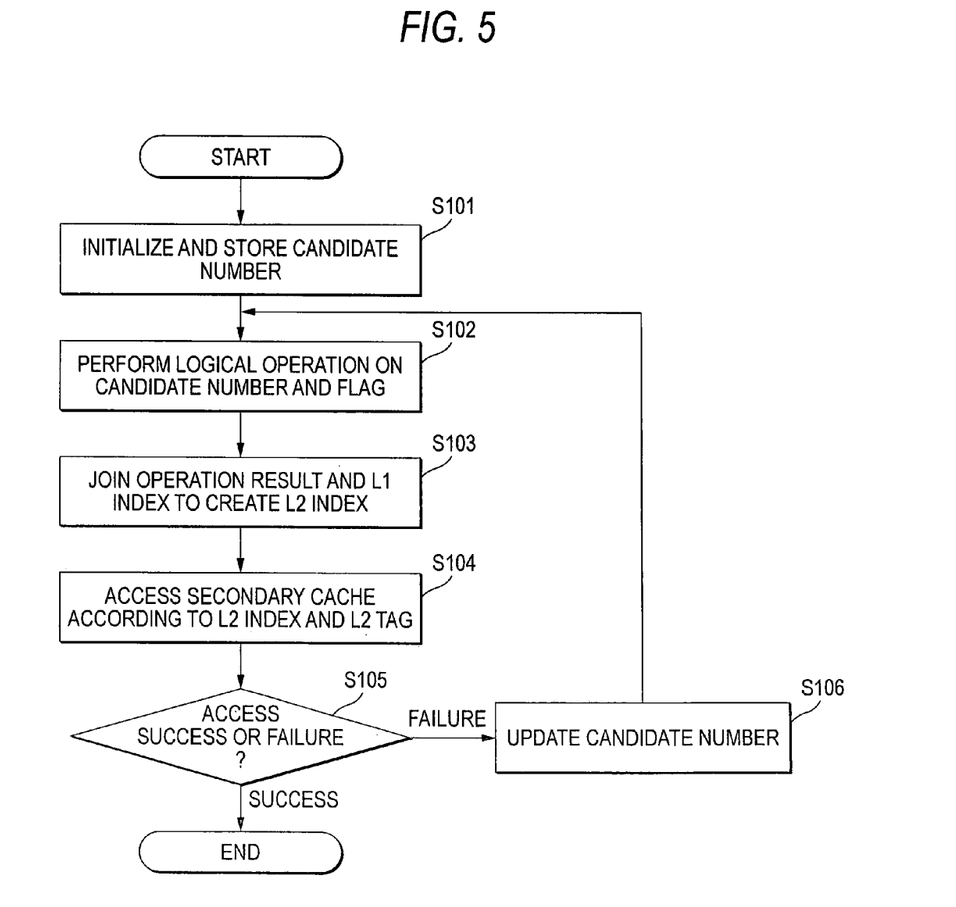
FIG. 5 is a flowchart to show the operation of the L2 index calculation section.

FIG. 5 is a flowchart to show the operation of the L2 index calculation section 100. For example, when the secondary cache controller 22 receives a command transmitted from the processor 10A and the L1 index and the flag of the address contained in the command are input to the L2 index calculation section 100, the operation is started. Here, it is assumed that the L1 index is address 100 (01100100) and the flag is 0 (000).

The candidate number register 111 stores the candidate number initialized at step S101. The candidate number is a bit string of three bits and is initialized to 0 (000). In the operation of the L2 index calculation section 100, however, the candidate number takes any of values 0 to 3 only and only the low-order two bits are significant bits. The purpose of setting the bit width of the candidate number to three bits is to make the bit width of the candidate number the same as the bit width of the flag to later perform exclusive-OR operation on the candidate number and the flag (three bits).

The first L2 index created when the candidate number is 0 (000) is called a first candidate; the second L2 index created when another candidate number is 1 (001) is called a second candidate; the third L2 index created when still another candidate number is 2 (010) is called a third candidate; and the fourth L2 index created when another candidate number is 3 (011) is called a fourth candidate.

The exclusive-OR computing unit 131 performs exclusive-OR operation on the candidate number 0 (000) stored in the candidate number register 111 and the flag 0 (000). When the first candidate is created, the operation result is 0 (000). Assuming that the operation at step S102 is performed in a similar manner, the operation result is 1 (001) for the candidate number 1 (001); the operation result is 2 (010) for the candidate number 2 (010); and the operation result is 3 (011) for the candidate number 3 (011).

The joining unit 141 joins the three-bit output of the exclusive-OR computing unit 131 and the eight-bit L1 index of the memory address at step S103. When the candidate number is 0 (000), the output 0 (000) of the exclusive-OR computing unit 131 and the L1 index 100 (01100100) to generate address 100 (00001100100) as the first candidate, and it is output to the secondary cache memory 21. Likewise, assuming that the output of the exclusive-OR computing unit 131 and the L1 index are joined at step S103, address 356 (00101100100) is generated for the second candidate and is output to the secondary cache memory 21. Address 612 (01001100100) is generated for the third candidate and is output to the secondary cache memory 21. Address 868 (01101100100) is generated for the fourth candidate and is output to the secondary cache memory 21.

An address of the secondary cache memory 21 is specified by the created 11-bit L2 index, and read access to the secondary cache memory 21 is performed (S104). That is, a comparison is made between the tag of the line data read from the storage area specified by the L2 index and the L2 tag to determine whether or not the reads access results in success (cache hit determination/cache miss determination) (step S105).

If the determination is cache hit determination, the L2 index calculation section 100 terminates the operation. On the other hand, if the determination is cache miss determination, the incrementing unit 121 adds one to the value of the candidate number stored in the candidate number register 111 at step S106. The method of changing the candidate number may be any method if the candidate number does not take a duplicate value until the candidate number is re-initialized after being once initialized. Here, to change the candidate number, the candidate number is incremented by way of example. Steps S101 to S104 described above are executed and whether or not read access based on the next created L2 index results in success is determined. If the read access results in failure, processing of changing the candidate number at step S106 and executing steps S101 to S105 is repeated.

Figure 6:
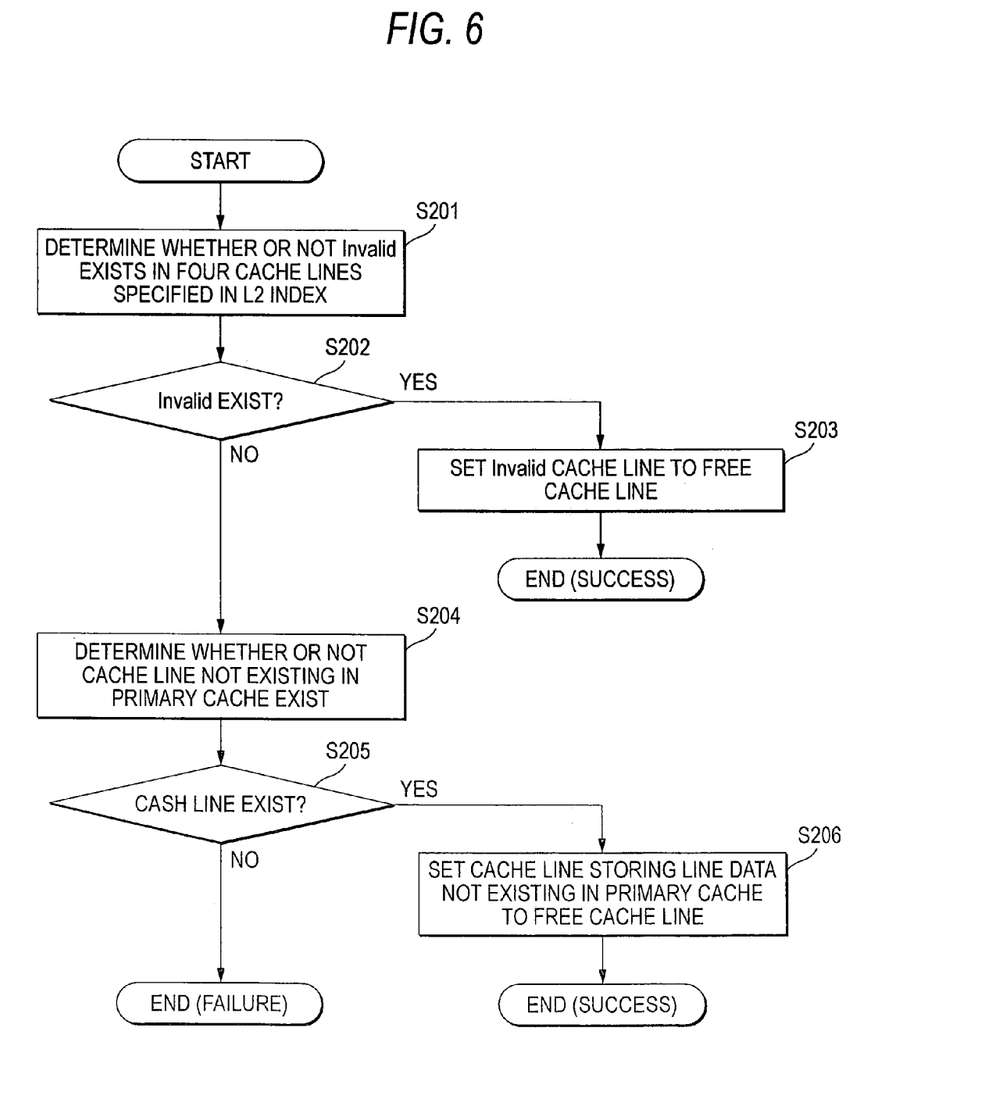
FIG. 6 is a flowchart to show a method of free space search for writing data into a secondary cache memory.

Next, a technique of free space search when writing data by the secondary cache controller 22 will be discussed with reference to FIG. 6.

For example, when writing data, the secondary cache controller 22 outputs the L2 index first created according to the address generation logic previously described with reference to FIG. 4 to the secondary cache memory 21 as the write address of the first candidate. The storage area of the secondary cache memory 21 specified by the L2 index of the first candidate contains four cache lines and the secondary cache controller 22 searches the four cache lines for a free cache line.

First, if a cache line where an Invalid flag is set exists in the four cache lines of the secondary cache memory 21 specified by the first candidate, the cache line is set to a free cache line (steps S201, S202, and S203). If more than one Invalid cache line exists, one cache line determined according to a predetermined rule is set as a data write area.

On the other hand, if no Invalid cache line exists at step S202, a search is made for line data stored in the secondary cache memory 21 although the data is deleted from the primary cache memory 12A to 12H and the cache line where the line data is stored is set as a data write area (steps S204, S205, and S206). If more than one cache line meeting the condition exists, one cache line determined according to a predetermined rule is set as a data write area.

If a data write area is not found according to the L2 index of the first candidate, the next area is searched for a free cache line. After this, using the L2 index of the second candidate created according to the address generation logic previously described with reference to FIG. 4, a data write area is found. If a data write area is not found, a search is made in sequence as the third candidate and the fourth candidate.

Since the free space search when writing data is performed in order starting at the first candidate, the probability that data will be stored in the storage area specified by the first candidate is the largest; the probability that data will be stored in the storage area specified by the second candidate is the second largest; the probability that data will be stored in the storage area specified by the third candidate is the third largest; and the probability that data will be stored in the storage area specified by the fourth candidate is the fourth largest.

Figure 7:
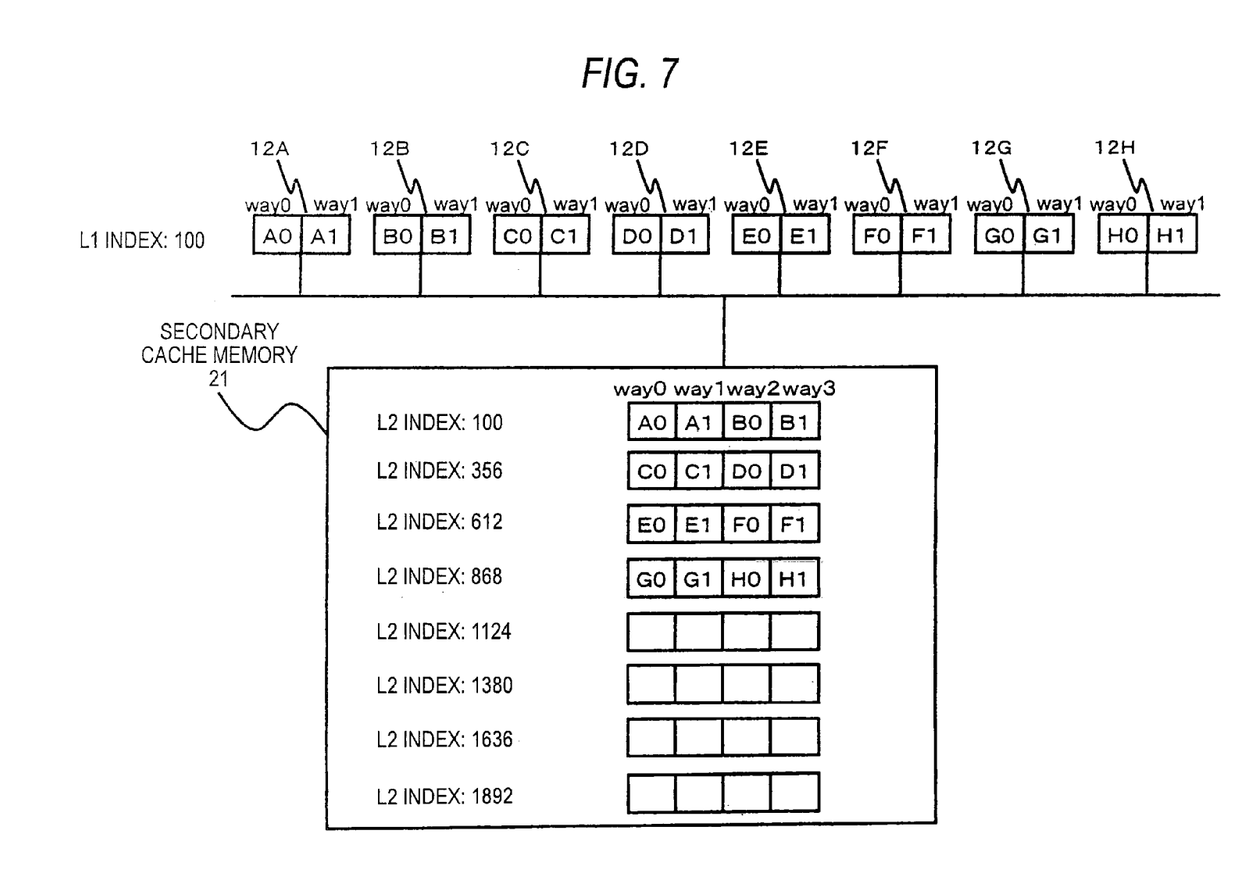
FIG. 7 is a drawing to show data stored in primary cache memories and the secondary cache memory.

The case where the processors 10A to 10H write data A0, A1, B0, B1, . . . H0, H1 into the internal primary cache memory 12A to 12H and the secondary cache memory 21 from a state in which data is stored in none of the primary cache memory 12A to 12H and the secondary cache memory 21 is considered. It is assumed that the L1 index of the data A0, A1, B0, B1, . . . H0, H1 is 100 and the flag is 0 (000). FIG. 7 shows the primary cache memory 12A to 12H and the secondary cache memory 21 at the time.

The first candidate in the L1 index 100, the flag 0 (000) is address 100, the second candidate is address 356 . . . the eighth candidate is address 1892, as described above. Free space search for writing is executed in order starting at the first candidate and thus the data A0, A1, B0, B1, . . . H0, H1 is stored in the storage areas specified in the first candidate to the fourth candidate.

Here, it is assumed that the processor 10A further transmits a write command of data XX of the L1 index 100, the flag 0 (000) to the primary cache memory unit 11A and the data A1 in the primary cache memory 12A is deleted and the data XX is written.

In the secondary cache memory 21, the data write area is determined according to the free space search method at the writing time previously described with reference to FIG. 6. Data where an Invalid flag is set does not exist in the data A0, A1, B0, B1, . . . H0, H1 stored in the secondary cache memory 21. However, since the data A1 is already deleted, the data A1 in the cache line of way 1 at address 100 is rewritten to the data XX according to step S204 in FIG. 6. After this, if data of the L1 index 100, the flag 0 (000) is further written into the secondary cache memory 21, the data write area can be determined in a similar manner.

Therefore, in the embodiment, it is guaranteed that line data stored in the secondary cache memory 21 although the data is deleted from the primary cache memory 12A to 12H always exists in the storage area specified in the first candidate to the fourth candidate. Thus, data is not written into the fifth candidate or later. Therefore, the first candidate to the fourth candidate may also be searched in search at the read time from the secondary cache memory 21.

Here, let the number of processors be P (where P is an integer of two or more), the primary cache memory contained in each processor be an N (where N is an integer of two or more)-way set associative type memory, and the secondary cache memory connected to the processors be an M-way set associative type memory (where M>N).

In the primary cache memories of total of P, (N×P) pieces of data are stored in the area specified by a specific L1 index (for example, address 100). To satisfy the multi-level inclusion mentioned above, (N×P) pieces of data stored in the P primary cache memories are stored in the secondary cache memory 21. The (N×P) pieces of data can be stored in storage areas specified in {(N×P)/M} L2 indexes. Therefore, if a similar technique to the free space search method at the writing time previously described with reference to FIG. 6 is used, the (N×P) pieces of data are always stored in any of the storage areas specified in the first candidate to the {(N×P)/M}-th candidate. At this time, in search at the data read time from the secondary cache memory 21, the first candidate to the {(N×P)/M}-th candidate may be searched.

Figure 8:
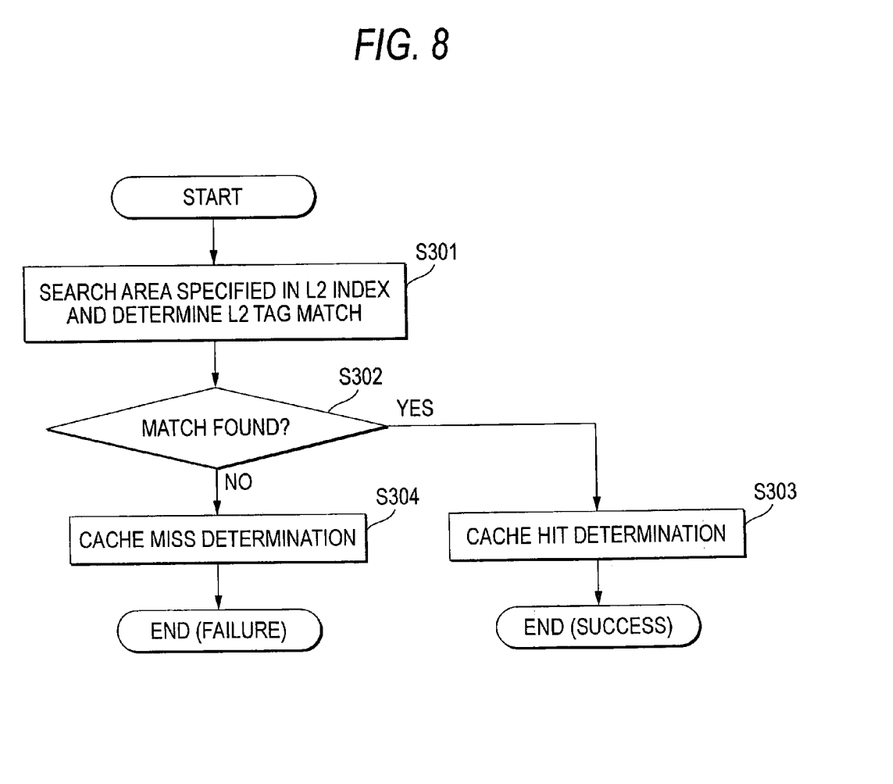
FIG. 8 is a flowchart to show a method of data search for reading data from the secondary cache memory.

Next, a data search method when reading data by the secondary cache controller 22 will be discussed with reference to FIG. 8.

As in the free space search performed when writing data, when reading data, the secondary cache controller 22 first generates the first L2 index according to the address generation logic previously described with reference to FIG. 4 and searches the secondary cache memory 21 using the L2 index as the read address of the first candidate. The area of the secondary cache memory 21 specified by the first candidate contains four cache lines.

Accordingly, the line data stored in the four cache lines of the secondary cache memory 21 specified by the first candidate is read at the same time and whether or not the tag of each piece of the line data and the L2 tag match is determined (steps S301 and S302). If a match pair of the line data tag and the L2 tag is found, the determination is cache hit determination; if a match pair is not found, the determination is cache miss determination.

If the determination is cache hit determination (step S303), the line data corresponding to the L2 tag is output and the data requested using the offset is extracted. The extracted data is transmitted to the processor 10A.

On the other hand, if the determination is cache miss determination (step S304), steps S301 and S302 are executed using the L2 index of the second candidate created according to the address generation logic previously described with reference to FIG. 4 and cache hit determination/cache miss determination is executed. If the determination is cache miss determination, a search is made in sequence as the third candidate and the fourth candidate. Since no data is written into the fifth candidate or later as described above, if the storage area specified by the fourth candidate is searched and cache miss determination occurs, it becomes necessary to read data from the main memory 40.

In the embodiment, when four cache miss determinations have been made, it becomes necessary to read data from the main memory 40. The number of cache miss determinations required until it is determined that data read from the main memory 40 is necessary can be determined {(N×P)/M} from the configuration of the information processing apparatus, namely, the number of processors P, the number of ways, N, of the primary cache memory contained in each processor, and the number of ways, M, of the secondary cache memory connected to the processors as described above.

As the described configuration is adopted, the data storage area can be determined the first candidate to the fourth candidate in the secondary cache memory 21 using the flag and the L1 index without adding any information to the address while satisfying the multi-level inclusion. Further, the secondary cache memory 21 is searched for read data in the order of the first candidate to the fourth candidate with large existence probability of data, so that the number of search times can be decreased and the operation of the secondary cache memory unit 20 can be speeded up and lower power consumption can be realized.

Further, the L1 index and the flag contained in the address are effectively utilized and the advantages described above are provided in a small circuit scale. This is also obvious from the fact that the components mainly added for creating a plurality of L2 indexes from the L1 index are the candidate number register 111, the incrementing unit 121, the exclusive-OR computing unit 131, and the joining unit 141.

Further, any desired operation for providing the output result in a one-to-one correspondence with the flag and the candidate number can also be selected instead of the exclusive-OR computing unit 131; the exclusive-OR operation can be realized according to an extremely simple configuration. In addition, as the types of operations, addition ignoring an overflow can also be performed.

Figure 9:
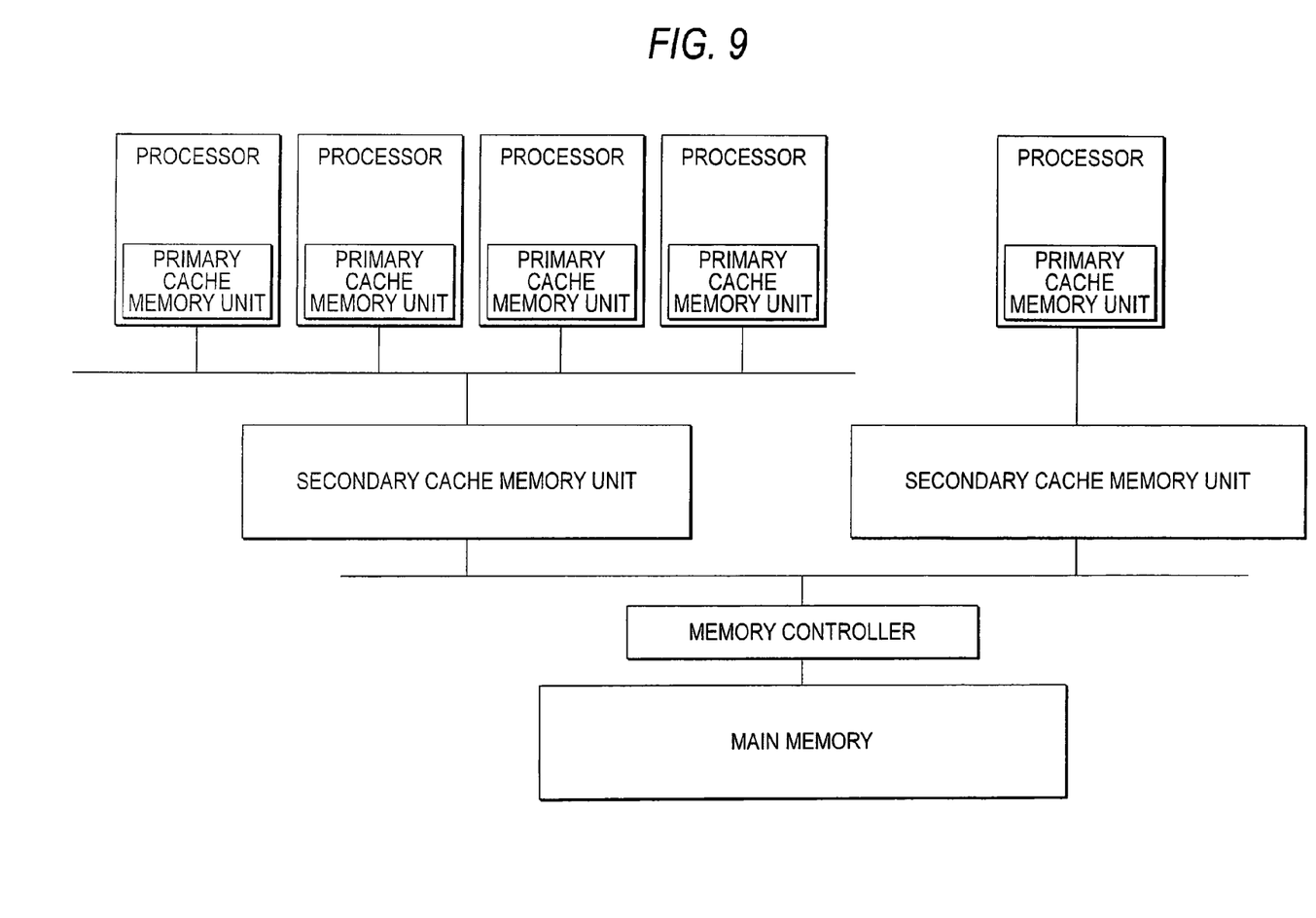
FIG. 9 is a drawing to show an example of the general configuration of an information processing apparatus including a plurality of processors and a hierarchical cache memory system.

The hierarchical cache memory system including the primary cache memories and the secondary cache memory shown in FIG. 1 has been described in the embodiment, but the present invention can also be applied to a hierarchical cache memory system as shown in FIG. 9.

Further, the information processing apparatus and the data search method according to the embodiment can also be easily expanded if the hierarchical cache memory system needs to include a tertiary cache memory, a quaternary cache memory, or a higher-order cache memory.

That is, the tertiary cache memory has a storage capacity more than the total of the storage capacities of the secondary cache memories connected to the tertiary cache memory and has controller for creating a plurality of L3 indexes from the L2 index. At this time, the number of bits of the candidate number becomes the difference between the number of bits of the L3 index and that of the L2 index. A bit string of as many bits as the number of bits of the candidate number is extracted from an L3 tag and is used as a flag. The tertiary cache memory is accessed using the L3 tag and a plurality of L3 indexes created from the L2 index in the uniquely determined order for the flag and the L2 index. The quaternary cache memory or higher-order cache memory can also be implemented in a similar manner.

The foregoing description of the embodiment has been presented for purposes of illustration and description. It is not intended to be exhaustive or to limit the invention to the precise form disclosed, and modifications and variations are possible in light of the above teachings or may be acquired from practice of the invention. The embodiment is chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. An information processing apparatus comprising:
   a main memory that stores data;
   a plurality of processors each provided with a primary cache memory;
   a secondary cache memory that is provided between the main memory and the processors, the secondary cache memory having larger capacity than one or more of the primary cache memories; and
   a cache controller that performs cache search on the secondary cache memory based on a second index uniquely generated by joining:
   1) a bit string having a predetermined bit length; and
   2) a first index that is included in a data access command transmitted from any one of the processors, the first index being used for performing cache search on the one or more of the primary cache memories,
   wherein the cache controller generates the bit string by performing a logical operation on a flag and a candidate number, the flag being included in the data access command, and the candidate number being updated when the cache controller performs a cache miss determination.

2. The information processing apparatus according to claim 1, wherein the cache controller comprises:
   a register that stores the candidate number;
   an update unit that updates the candidate number stored in the register when the cache miss determination is performed;
   an computing unit that performs the logical operation on the flag and the candidate number stored in the register to produce an operation result; and
   a joining unit that joins the first index and the operation result output from the computing unit.

3. The information processing apparatus according to claim 1, wherein the cache controller updates the bit string when the cache controller performs the cache miss determination.

4. The information processing apparatus according to claim 3, wherein the cache controller generates the second index and performs the cache search on the secondary cache memory based on the second index for a number of times in a unique order, every time the bit string is updated.

5. The information processing apparatus according to claim 4, wherein the cache controller terminates the cache search when the cache miss determination is performed for {(N×P)/M} times,
   wherein P is the number of the processors (an integer of two or more),
   wherein the primary cache memory is an N-way set associative type memory (N is an integer of two or more), and
   wherein the secondary cache memory is an M-way set associative type memory (M is an integer larger than N).

6. A secondary cache memory chip provided between a main memory that stores data and a plurality of processors each provided with a primary cache memory, the secondary cache memory chip comprising:
   a secondary cache memory that has larger capacity than one or more of the primary cache memories; and
   a cache controller that performs cache search on the secondary cache memory based on a second index uniquely generated by joining:
   1) a bit string having a predetermined bit length; and 2) a first index that is included in a data access command transmitted from any one of the processors, the first index being used for performing cache search on the one or more of the primary cache memories, wherein the cache controller generates the bit string by performing a logical operation on a flag and a candidate number, the flag being included in the data access command, and the candidate number being updated when the cache controller performs a cache miss determination.

7. The secondary cache memory chip according to claim 6, wherein the cache controller comprises:

a register that stores the candidate number;

an update unit that updates the candidate number stored in the register when the cache miss determination is performed;

an computing unit that performs the logical operation on the flag and the candidate number stored in the register to produce an operation result; and a joining unit that joins the first index and the operation result output from the computing unit.

8. The secondary cache memory chip according to claim 6, wherein the cache controller updates the bit string when the cache controller performs the cache miss determination.

9. The secondary cache memory chip according to claim 8, wherein the cache controller generates the second index and performs the cache search on the secondary cache memory based on the second index for a number of times in a unique order, every time the bit string is updated.

10. The secondary cache memory chip according to claim 9, wherein the cache controller terminates the cache search when the cache miss determination is performed for $\{(N \times P)/M\}$ times, wherein P is the number of the processors (an integer of two or more), wherein the primary cache memory is an N-way set associative type memory (N is an integer of two or more), and wherein the secondary cache memory is an M-way set associative type memory (M is an integer larger than N).

11. A method for performing cache search in an information processing apparatus having:

a main memory that stores data;

a plurality of processors each provided with a primary cache memory; and a secondary cache memory that is provided between the main memory and the processors, the secondary cache memory having larger capacity than one or more of the primary cache memories, wherein the method comprises:

generating a second index by joining:

1) a bit string having a predetermined bit length; and 2) a first index that is included in a data access command transmitted from any one of the processors, the first index being used for performing cache search on the one or more of the primary cache memories;

performing cache search on the secondary cache memory based on the second index; and generating the bit string by performing a logical operation on a flag and a candidate number, the flag being included in the data access command, and the candidate number being updated when a cache miss determination is performed.

12. The method according to claim 11 further comprising updating the bit string when a cache miss determination is performed.

13. The method according to claim 12, wherein the generation of the second index and the performing of the cache search on the secondary cache memory based on the second index are repeated for a number of times in a unique order, every time the bit string is updated.

14. The method according to claim 13 further comprising terminating the cache search when the cache miss determination is performed for $\{(N \times P)/M\}$ times, wherein P is the number of the processors (an integer of two or more), wherein the primary cache memory is an N-way set associative type memory (N is an integer of two or more), and wherein the secondary cache memory is an M-way set associative type memory (M is an integer larger than N).

* * * * *